United States Patent
Kumar

(10) Patent No.: US 12,043,135 B2
(45) Date of Patent: Jul. 23, 2024

(54) ASSISTED PARKING OF ELECTRICAL VEHICLE AT CHARGING STATION

(71) Applicant: Atieva, Inc., Newark, CA (US)

(72) Inventor: Nikhil Kumar, Fremont, CA (US)

(73) Assignee: Atieva, Inc., Newark, CA (US)

( * ) Notice: Subject to any disclaimer, the term of this patent is extended or adjusted under 35 U.S.C. 154(b) by 358 days.

(21) Appl. No.: 17/444,638

(22) Filed: Aug. 6, 2021

(65) Prior Publication Data

US 2023/0038722 A1 Feb. 9, 2023

(51) Int. Cl.
| | | |
|---|---|---|
| *B60L 3/00* | (2019.01) | |
| *B60L 53/30* | (2019.01) | |
| *B60L 53/36* | (2019.01) | |
| *B60L 53/66* | (2019.01) | |
| *B60W 30/06* | (2006.01) | |
| *G05D 1/00* | (2006.01) | |
| *H04W 4/40* | (2018.01) | |
| *H04W 4/80* | (2018.01) | |

(52) U.S. Cl.
CPC .......... *B60L 53/66* (2019.02); *B60L 53/305* (2019.02); *B60L 53/36* (2019.02); *B60W 30/06* (2013.01); *G05D 1/0011* (2013.01); *H04W 4/40* (2018.02); *H04W 4/80* (2018.02); *B60W 2554/80* (2020.02); *B60W 2556/45* (2020.02)

(58) Field of Classification Search
CPC ........ B60L 53/66; B60L 53/305; B60L 53/36; B60L 53/35; B60L 53/14; B60L 3/00; B60W 30/06; B60W 2554/80; B60W 2556/45; G05D 1/0011; H04W 4/40; H04W 4/80; Y02T 10/70; Y02T 10/7072; Y02T 90/12; Y02T 90/14; G01S 13/765; G01S 13/878
USPC .......................................................... 701/22
See application file for complete search history.

(56) References Cited

U.S. PATENT DOCUMENTS

| | | | |
|---|---|---|---|
| 2015/0015193 A1* | 1/2015 | Oman | B60L 53/126 |
| | | | 320/108 |
| 2019/0297454 A1* | 9/2019 | Smith | H04W 84/18 |
| 2021/0380003 A1* | 12/2021 | Spiro | B60L 53/12 |
| 2022/0176839 A1* | 6/2022 | Lieberman | B60L 53/16 |

OTHER PUBLICATIONS

Hartmann, F. et al.: "Design of an Embedded UWB Hardware Platform for Navigation in GPS Denied Environments," Conference: 22nd IEEE Symposium on Communications and Vehicular Technology in the Benelux (SCVT), Luxembourg, Nov. 2015, 7 pages.

(Continued)

*Primary Examiner* — Shardul D Patel
(74) *Attorney, Agent, or Firm* — Brake Hughes Bellermann LLP

(57) ABSTRACT

A vehicle includes a charging port for connection to a charging cable capable of delivering electricity to the vehicle, and an ultra-wide band (UWB) transceiver module. The UWB transceiver module includes a master node and at least three antenna nodes. The at least three antenna nodes are deployed at correspondingly diverse locations in the vehicle at fixed distances from the charging port. The master node is configured to determine a position of an UWB antenna or tag external to the vehicle relative to the locations of the at least three antenna nodes and the charging port.

18 Claims, 8 Drawing Sheets

(56) References Cited

OTHER PUBLICATIONS

Tiemann, J., et al.: "Ultra-wideband Aided Precision Parking for Wireless Power Transfer to Electric Vehicles in Real Life Scenarios," 2016 IEEE 84th Vehicular Technology Conference (VTC-Fall), Sep. 18-21, 2016, 5 pages.
International Search Report and Written Opinion for PCT Application No. PCT/US2022/074532, mailed on Nov. 17, 2022, 11 pages.

* cited by examiner

ASSISTED PARKING OF ELECTRICAL VEHICLE AT CHARGING STATION

TECHNICAL FIELD

This disclosure relates to charging of electrical vehicles at a charging station.

BACKGROUND

Charging stations, also called electric vehicle charging stations, are machines that supply electric energy to charge plug-in electric vehicles—including cars, neighborhood electric vehicles, trucks, buses and others.

A charging station may provide electrical power over a custom charging cable that has a specific end connector that plugs into a vehicle socket (e.g., a charging port) on the vehicle.

SUMMARY

In a general aspect a vehicle (e.g., an electric vehicle, an autonomous vehicle), includes a charging port for connection to a charging cable capable of delivering electricity to the vehicle, and an ultra-wide band (UWB) transceiver module. The charging cable can have a fixed length L, and deliver electricity to the vehicle from a charging station. The UWB transceiver module includes a master node and at least three antenna nodes. The at least three antenna nodes are deployed at correspondingly diverse locations in the vehicle at fixed distances from the charging port. Further, the master node is configured to determine a position of an UWB antenna or tag external to the vehicle relative to the locations of the at least three antenna nodes and the charging port.

In an aspect, the UWB antenna or tag external to the vehicle is disposed on a charging station from which the charging cable can be extended toward the charging port.

In a general aspect, a computer-implemented method includes detecting, on a vehicle, a presence of a charging station in Bluetooth low energy (BLE) communication range of the vehicle. The charging station includes an ultra-wide band (UWB) communication antenna or tag. The method further includes determining, by UWB communications, a distance of a charging port on the vehicle from the charging station, and guiding the vehicle to parking position in a parking space associated with the charging station for connection to a charging cable based on an available length of the charging cable and the determined distance of the charging port on the vehicle from the charging station.

BRIEF DESCRIPTION OF DRAWINGS

Like reference symbols or numerals in the various drawings indicate like elements.

DETAILED DESCRIPTION

Charging stations, also called electric vehicle charging stations, electric recharging points, charging ports, charge points, electronic charging stations (ECSs), and/or electric vehicle supply equipment (EVSE), are machines that supply electric energy to charge plug-in electric vehicles (EV)—including cars, neighborhood electric vehicles, trucks, buses and others.

The charging stations may have tethered (or untethered) power charging cables for supplying electricity to charge electrical vehicles. The cables with a current rating (e.g., 16A or 32A) can carry single or three-phase electricity, and can vary in length. A charging station may provide electrical power over a custom charging cable that has a specific end connector that plugs into a vehicle socket (e.g., a charging port (CP)) on the vehicle.

Figure 1:
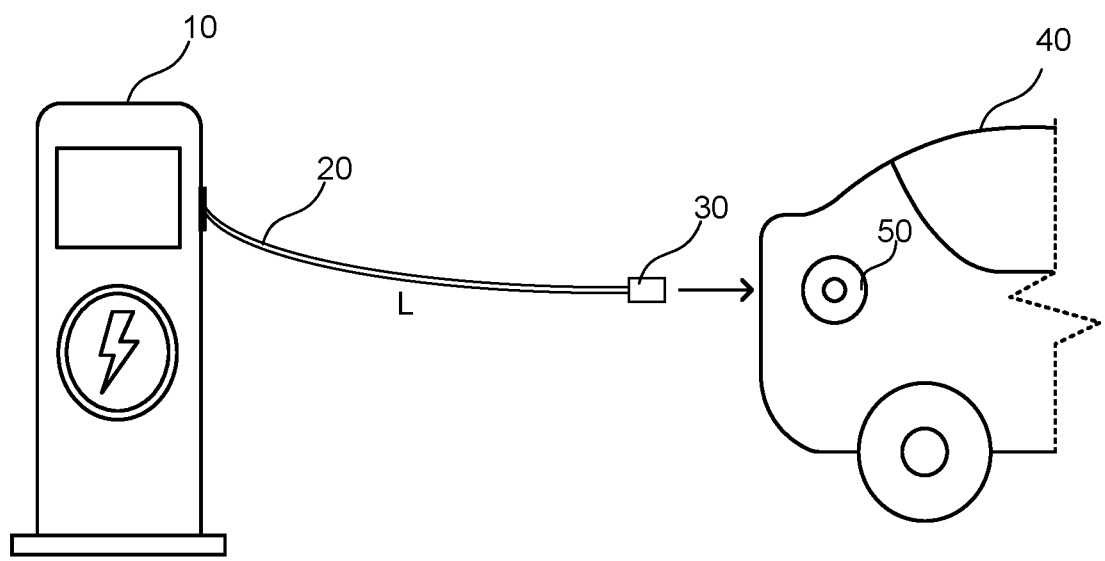
FIG. 1 is a schematic illustration of an electric vehicle.

FIG. 1 schematically illustrates an electric vehicle (e.g., electric vehicle 40) parked next to a charging station 10. Charging station 10 may have, for example, a charging cable 20 with an end connector 30 that can align with, and electrically couple to (e.g., fit into), a vehicle socket (e.g., charging port 50) on electric vehicle 40. Electric vehicle 40 may, for example, be a human driven vehicle or a self-driving vehicle (e.g., an autonomous computer-driven vehicle).

Figure 2:
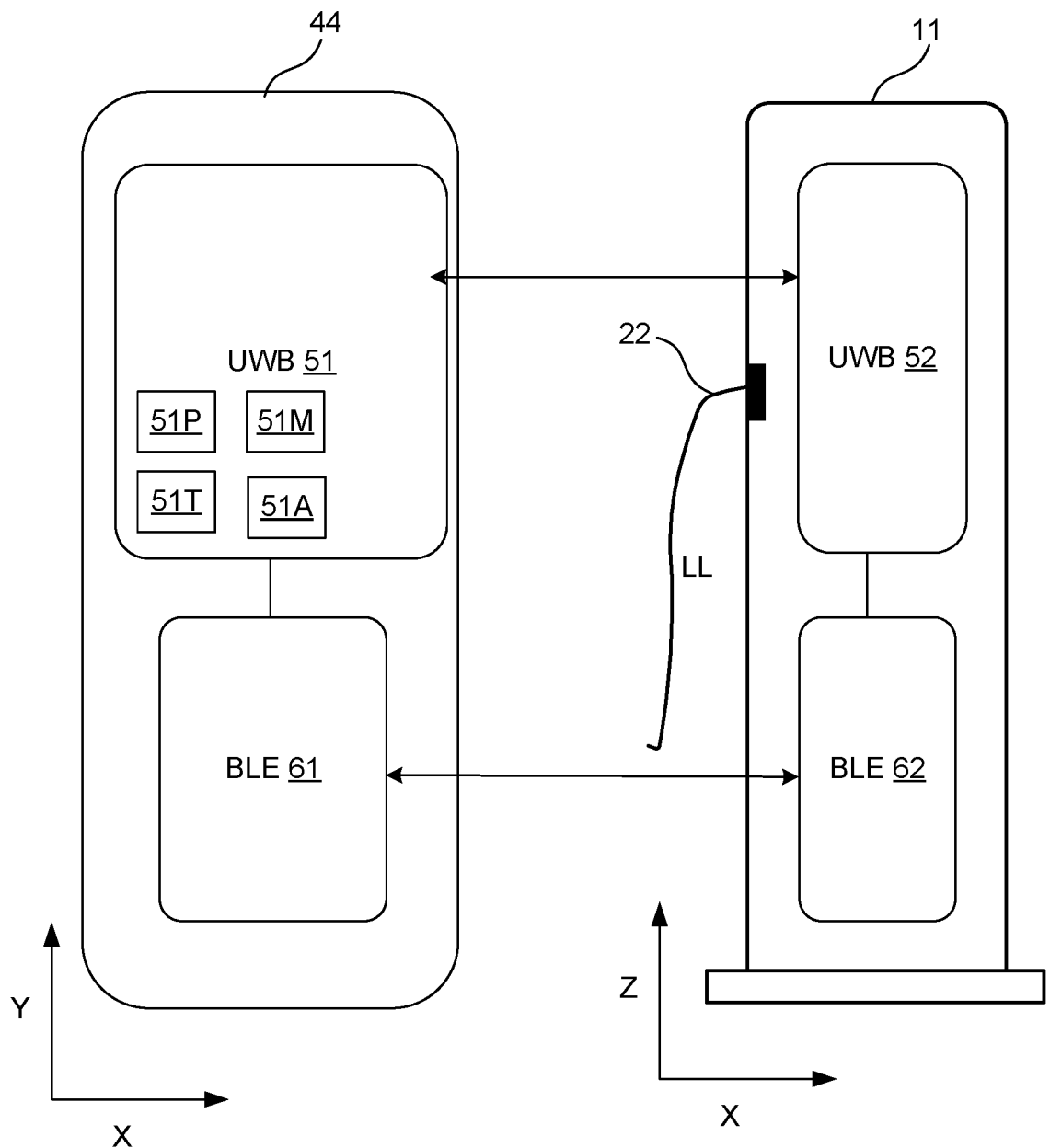
FIG. 2 is a block diagram illustration of a system for radio communications between a vehicle and a charging station.

In example implementations, charging cable 20 may have a length L (e.g., as shown in FIG. 2) between charging station 10 and end connector 30. Length L may represent an available length corresponding to a maximum distance over which the charging cable may be extended away from charging station 10 to reach and fit in a vehicle socket (e.g., charging port 50) for recharging an electric vehicle.

The charging cables (e.g., charging cable 20) installed, for example, on different types or brands of charging stations (e.g., charging station 10) can have different standardized or non-standard lengths L.

Each electric vehicle typically has a single charging port (e.g., charging port 50) that needs to be connected to the charging station by charging cable 20 of length L for charging the vehicle. The placement of the charge port on an electric vehicle is not standardized between vehicles of different brands, models, or type. Further, there may be are different standards or/types of charge port. FIG. 1 shows charging port 50 disposed on a rear right side of the electrical vehicle only as an example representative placement for purposes of illustration.

Further, different charging stations may be located on different sides of the vehicle that is being charged (e.g., a left side or a right side, or at the end, of a parking spot for the vehicle). Each charging station may have one or more designated (marked or unmarked) parking spots or spaces next to the charging station for parking a vehicle for recharging. Each charging station may be located to a side (e.g., a left side, or a right side) of a designated parking space or at the head of the designated parking space. The terms "parking spot" and "parking space" may be used interchangeably herein.

As shown only for example in FIG. 1, charging port 50 is located on a rear right side of electrical vehicle 40. However, the location of the charging port on a vehicle can vary with the model or make of the vehicle. The charging port may, for example, be located on any one of the front, the rear, the front left side, the front right side, the rear left side, or the rear right side for any particular model or make of the vehicle. For recharging, a vehicle needs to be properly oriented and positioned in a parking space next to the charging station so that a charging cable of given length can reach the charging port on the vehicle.

The diversity in the locations of the charging stations, in charging cable lengths, in the locations of the parking spaces designated for recharging, in vehicle size and type, and in the locations of the charging ports on the vehicles can make it confusing or difficult to maneuver a vehicle to a proper position within reach of the charging cable (in a parking space next to a charging station for recharging). A driver may have to repeatedly jockey the vehicle (e.g., in and out of the parking space), or reorient the direction of the vehicle, to properly position the vehicle in the parking space so that the charging port is within reach of the charging cable whose length may not be known to the driver. The driver may have to repeatedly step out of the vehicle to physically inspect the proximity of the charging cable and the charging port on the vehicle, and determine, for example, by trial and error, if the charging port is within reach of the charging cable.

Systems and methods for guiding a vehicle driver to properly park an electric vehicle for recharging at a charging station are described herein as examples.

The disclosed systems and methods may eliminate a need for a driver to get out of, and again back into, a parked vehicle to re-park the vehicle (i.e., readjust the location of the vehicle) upon finding out that the vehicle is parked too far from the charging station and the charging cable cannot reach the vehicle's charge port.

The systems and methods involve using relatively short range ultra-wide band radio signals to triangulate the distance between the electric vehicle and the charging station, and to localize the position of the electric vehicle relative to the position of the charging station. The systems and methods involve determining the distance between the electric vehicle and the charging station based, for example, on time of flight measurements of radio signals exchanged between the electric vehicle and the charging station. The distance between the electric vehicle and the charging station (when in ultra-wide band radio communication range of about 1-50 meters) may be determined precisely with a resolution, for example, of less than 50 cm (e.g., 10-30 cm). In example implementations, a distance between the between the electric vehicle and the charging station may be triangulated or measured continually as the vehicle is being parked in a parking space next to the charging station. Based on the measured distance and the length of the charging cable, driving instructions may be provided to prompt or guide the driver to drive the vehicle to a proper parking position for recharging (i.e., a position in which the charging cable can reach, and be connected to, the vehicle's charging port). The instructions may be provided, for example, via visual and/or audio means, to a human driver as the vehicle is being parked in the parking space next to the charging station. For a self-driving or autonomous vehicle, the instructions may be provided electronically to a vehicle drive controller or navigation system.

FIG. 2 is a block diagram illustrating a system 200 for radio communications including ultra-wide band radio communications between a vehicle (e.g., electric vehicle 44) and a charging station (e.g., charging station 11). Charging station 11 may have a charging cable 22 of a length LL available for charging electric vehicles. For ease of visualization of relative positions, electric vehicle 44 and charging station 11 are shown in FIG. 2 from different perspectives: electric vehicle 44 is shown (e.g., in a top view) in an X-Y plane, while charging station 11 is shown (e.g., in a top view) in an X-Z plane.

System 200 may include an ultra-wide band (UWB) communications module (e.g., a UWB transceiver module, UWB module 51) disposed in an electric vehicle (e.g., electric vehicle 44) and an ultra-wide band communication module (e.g., UWB module 52) disposed in a charging station (e.g., charging station 11). UWB module 51 and UWB module 52 may be configured for short-range, high-bandwidth communications over a radio frequency spectrum. Each of the UWB modules may include at least one processor, at least one radio transmitter, radio receiver, or radio transceiver, and one or more antennas). For example, as shown in FIG. 2, UWB module 51 may include a memory 51M, at least one processor 51P, at least one radio transceiver 51T, and at least one antenna 51A). UWB module 51 and UWB module 52 may communicate UWB radio signals between antennas in the two modules when electric vehicle 44 is close to (e.g., about 50 meters or less) charging station 11. The UWB radio signals may be in a frequency range from about 2 GHz (e.g., about 3.1 GHz) to about 12 GHz (e.g., about 10.6 GHz). The UWB radio signals may have a bandwidth of at least about 500 MHz. In example implementations, the UWB modules may communicate radio signals effectively over short ranges, generally between 0-50 meters, and may work best with line of sight between devices, antennas, or anchors. In example implementations, to save power, UWB module 51 and or UWB module 52 may be activated only after vehicle 44 is close (e.g., between 1-20 meters) to UWB module 52.

In example implementations, system 200 may further include Bluetooth wireless communication modules (e.g., Bluetooth Low Energy wireless communications modules, BLE 61 and BLE module 62) disposed in the electric vehicle (e.g., electric vehicle 44) and the charging station (e.g., charging station 11), respectively. BLE 61 and BLE 62 may be configured for relatively low power radio communications between the electric vehicle and the charging station (e.g., using low-power radio signals in a frequency band between about 2.440 GHz and about 2.483.5 GHz). The Bluetooth wireless modules (i.e., BLE 61 and BLE 62) may have a communication range (e.g., up to about 100 meters or more) that is substantially greater than a UWB communication range (e.g., 1-50 meters).

In example implementations, the Bluetooth wireless communication modules (e.g., BLE 62) may be configured to detect an approaching vehicle (e.g., electric vehicle 44) at some distance (e.g., about 100 meters away) from charging station 11). In response to such detection, BLE 62, may, for example, designate one or more parking spaces at the charging station as potential recharging spots or positions for the approaching vehicle.

BLE 61 and BLE 62 may be configured to exchange information related to characteristics of the charging station (e.g., available length LL of charging cable, type of cable end connector, orientation and coordinates of associated parking spaces, etc.) and information related to characteristics of the vehicle (e.g., type of vehicle, dimensions of the vehicle, type and location of charging port on the vehicle, locations of antennas on the vehicle, etc.)

BLE 61 and BLE 62 may be further configured to activate the UWB modules (i.e., UWB module 51 in electrical vehicle 44, and UWB module 52 in charging station 11) when the approaching vehicle (e.g., electric vehicle 44) is close within a UWB communication range (e.g., between 1-20 meters) of the charging station. The UWB modules may provide a higher resolution measurement of the distance between the approaching vehicle (e.g., electric vehicle 44) and the charging station (e.g., charging station 11) than may be obtained by the Bluetooth wireless communication modules for guiding the approaching vehicle (e.g., electric vehicle 44) into the parking space for recharging.

The antennas (e.g., antenna 51A) disposed on the approaching vehicle (e.g., electric vehicle 44) and on the charging station (e.g., charging station 11) may form a wireless network for UWB communications. The term "antenna node" as used herein may refer to an antenna (and associated electronics) disposed at a node of the wireless network. The distance between any two antenna nodes or antennas (e.g., an antenna on the vehicle and an antenna on the charging station) in the wireless network may be determined, for example, using techniques based on the measurement of the signal propagation such as Time of Arrival (ToA), Time of Flight (ToF), Time Difference of Arrival (TDoA), and/or Two Way Ranging (TWR).

Figure 3:
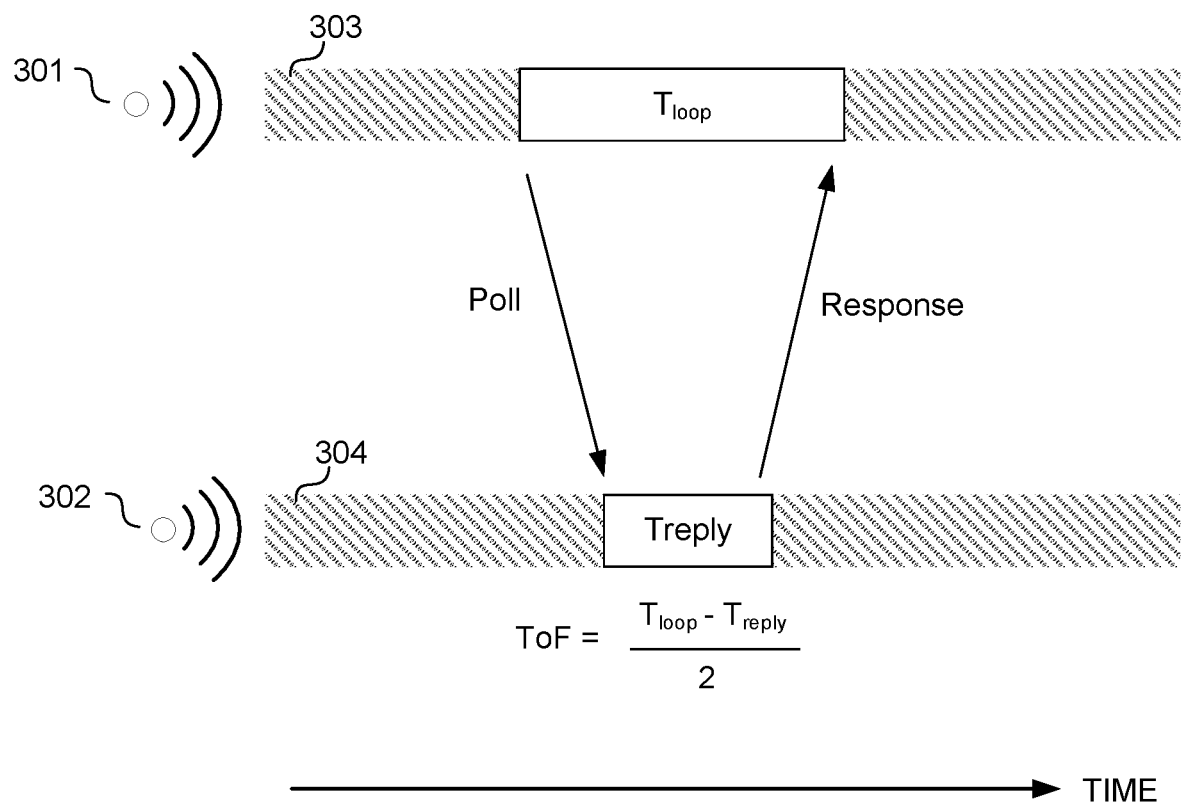
FIG. 3 is a schematic illustrating of an example implementation of a time-of flight (ToF) technique to determine the distance between a transmitting antenna and a receiving antenna.

FIG. 3 is a schematic illustrating an example ToF technique that can be used in an example implementation to determine the distance between a transmitting antenna and a receiving antenna (e.g., antenna 301 and antenna 302). As shown in the FIG. 3, antenna 301 may periodically transmit a pulsed UWB signal 303 with a poll packet periodically (e.g., at period times=$T_{loop}$). Antenna 302 may reply with a pulsed UWB signal 304 including a response packet. $T_{reply}$ may be the interval between the arrival of the poll packet and the departure of the response packet. In such instance, ToF is given as $$ToF = \frac{Tloop - Treply}{2}$$

and the distance between the two antennas is obtained by multiplying the ToF with the speed of light.

In some example UWB localization systems and methods, trilateration may be used to determine the location (e.g., Cartesian co-ordinates X, Y) of the vehicle relative to the charging station. Trilateration can work by finding a series of circles that intersect with each other to determine the location.

For UWB localization of electric vehicle 40, at least three sensor or anchor nodes (i.e., antenna nodes with known positions) (e.g., on electric vehicle 40) are needed to accomplish trilateration, for example, in x-y cartesian space.

In an example implementation, for UWB localization of electric vehicle 40, UWB module 52 may include a UWB anchor node placed at a fixed position on charging station 11. The UWB anchor node may include an active or passive antenna circuit, and may be referred to herein as an anchor node (antennas) or an UWB antenna. In some instances, the UWB anchor node may include externally readable identifying information, and may be referred to herein as anchor node (tag) or UWB tag. Further, UWB module 51 may include one or more UWB anchor nodes (antennas) placed at fixed positions on electric vehicle 40. UWB module 51 may also include a master node disposed on electric vehicle 40. Each anchor node and the master node may be based on, or include, for example, a UWB transceiver, and include a processor. In example implementations, the master node may also be coupled by wire or wirelessly to other computers (e.g., an on-board computer on the vehicle, or an off-vehicle computer) (not shown).

Figure 4:
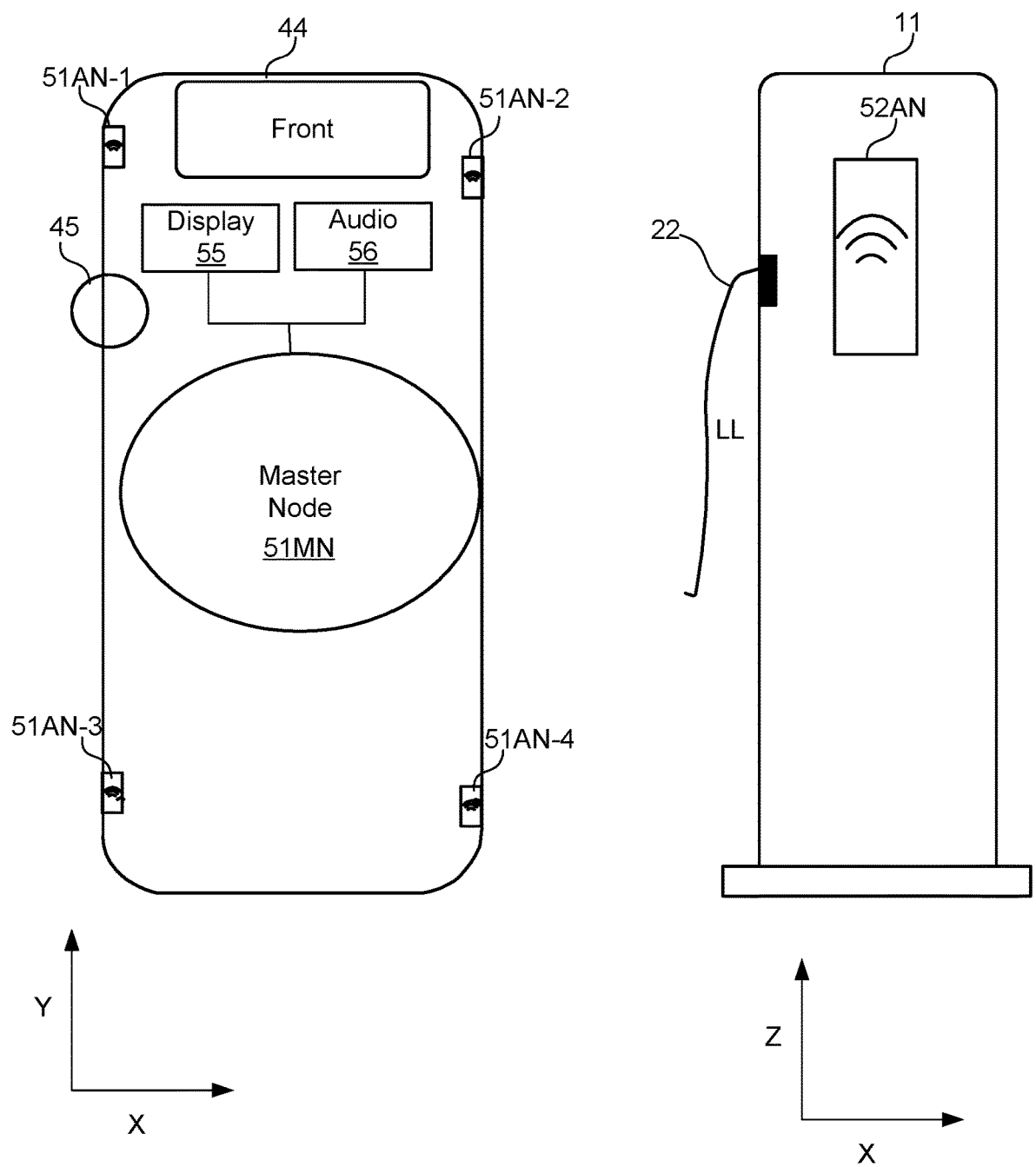
FIG. 4 is a schematic illustration of an ultra-wideband communications module deployed in a vehicle.

FIG. 4 is a schematic illustration of an ultra-wideband communications module deployed in a vehicle (e.g., electric vehicle 44, FIG. 2) for communication with a charging station (e.g., charging station 11, FIG. 2).

In an example implementation (as shown in FIG. 4), UWB module 52 (FIG. 2) disposed on charging station 11 includes a UWB anchor node or a UWB tag (e.g., UWB tag 52AN) placed at a fixed position on charging station 11. Further, UWB module 51 (FIG. 2) disposed on electric vehicle 44 includes a master node (e.g., 51MN) and at least three anchor nodes (e.g., four anchor nodes 51AN-1, 51AN-2, 51AN-3, 51AN-4, respectively) placed at fixed positions (e.g., corner positions) on electric vehicle 40. The master node may be connected to a visual display (e.g., display 55) and or an audio speaker (e.g., audio 56) on electric vehicle 40 either directly as shown, for example, in FIG. 4, or via another computing device (e.g., a vehicle controller) (not shown).

The master node may be configured to, for example, command initiation of UWB ranging sessions, receive sensing information from the anchor nodes and other sensors, process the information to determine distances, and log data to a computer (e.g., an on-board or off-the vehicle computer). The master node may, for example, determine ToF of signals between the antennas to estimate the distances of the charging station from each of the anchor nodes (e.g., anchor nodes 51AN-1, 51AN-2, 51AN-3, 51AN-4) placed on electric vehicle 40.

Figure 5:
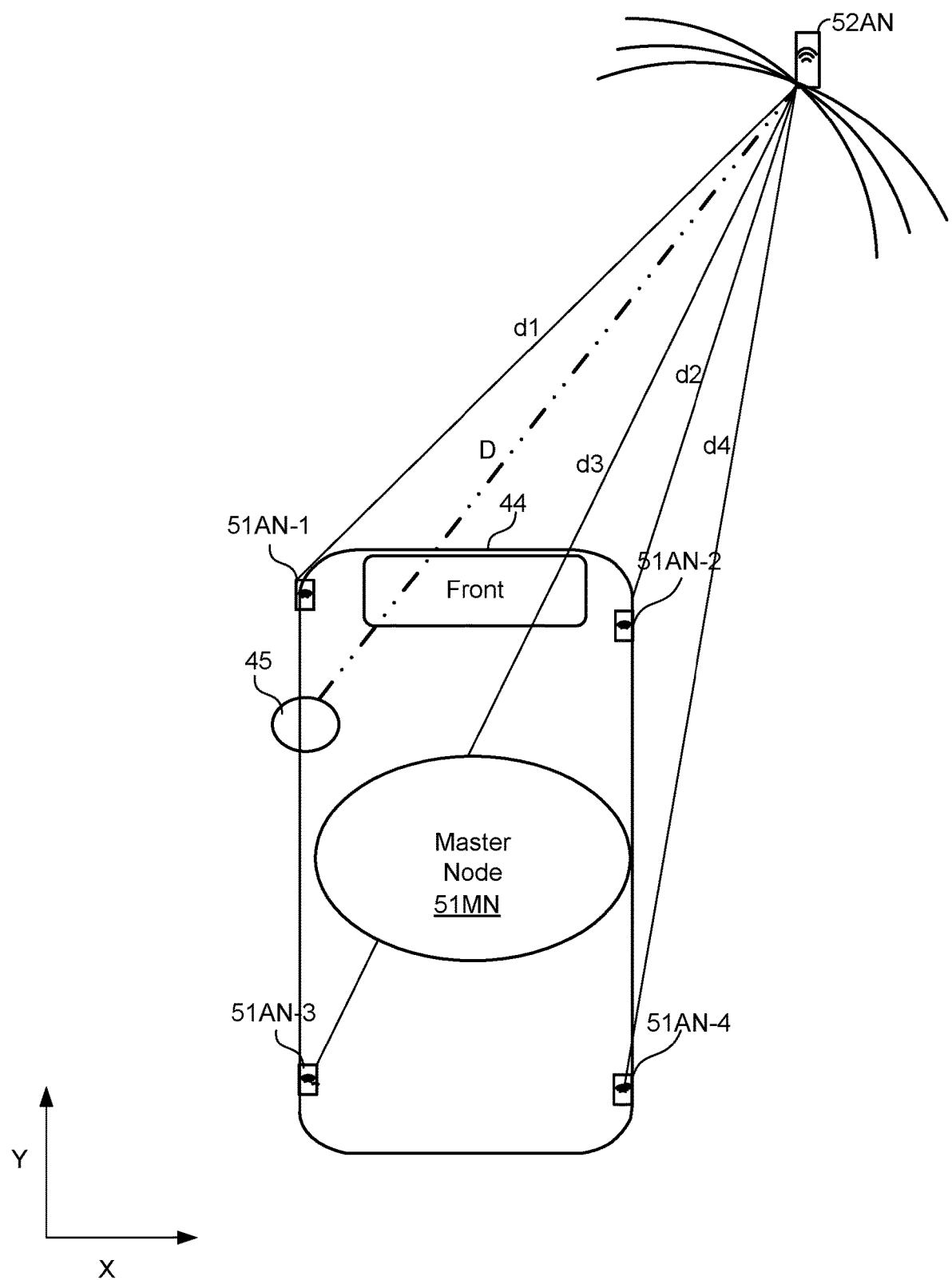
FIG. 5 is a schematic illustration of the estimated distances an anchor node on a charging station from each of anchor node placed on an electric vehicle.

FIG. 5 illustrates, for example, the estimated distances (e.g., distances d1, d2, d3 and d4) of anchor node 52AN (on charging station 11) from each of the anchor nodes (e.g., anchor nodes 51AN-1, 51AN-2, 51AN-3, 51AN-4) placed on electric vehicle 40. Master node 51MN (or other computer) may combine these estimated distances with information on the locations of the anchor nodes (e.g., anchor nodes 51AN-1, 51AN-2, 51AN-3, 51AN-4) and the location of charging port 45 on electric vehicle 44 to determine a distance D of charging port 45 on electrical vehicle 44 from charging station 11 (i.e., from anchor node 52AN on charging station 11).

In example implementations, master node 51MN (or other computer) may include algorithms to compare the distance D of charging port 45 on electrical vehicle 44 from charging station 11 with the available length LL of the charging cable (e.g., charging cable 22, FIG. 2). Based on this comparison, master node 51MN (or other computer) may prepare instructions to prompt or guide parking of electrical vehicle 44 in a specific parking position where the available length L of the charging cable is greater than the distance D of charging port 45 from the charging station (in other words, where charging port 45 on electrical vehicle 44 is reachable for connection to the charging cable). In example implementations, the instructions to prompt or guide parking of electrical vehicle 44 may be delivered to a driver of electrical vehicle 44 as text or graphics on a visual display (e.g., display 55) and/or voice on an audio speaker (audio 56) (FIG. 4). In some example implementations, the instructions to prompt or guide parking of a self-driving vehicle may be delivered to an autonomous vehicle controller or navigation system.

Figure 6:
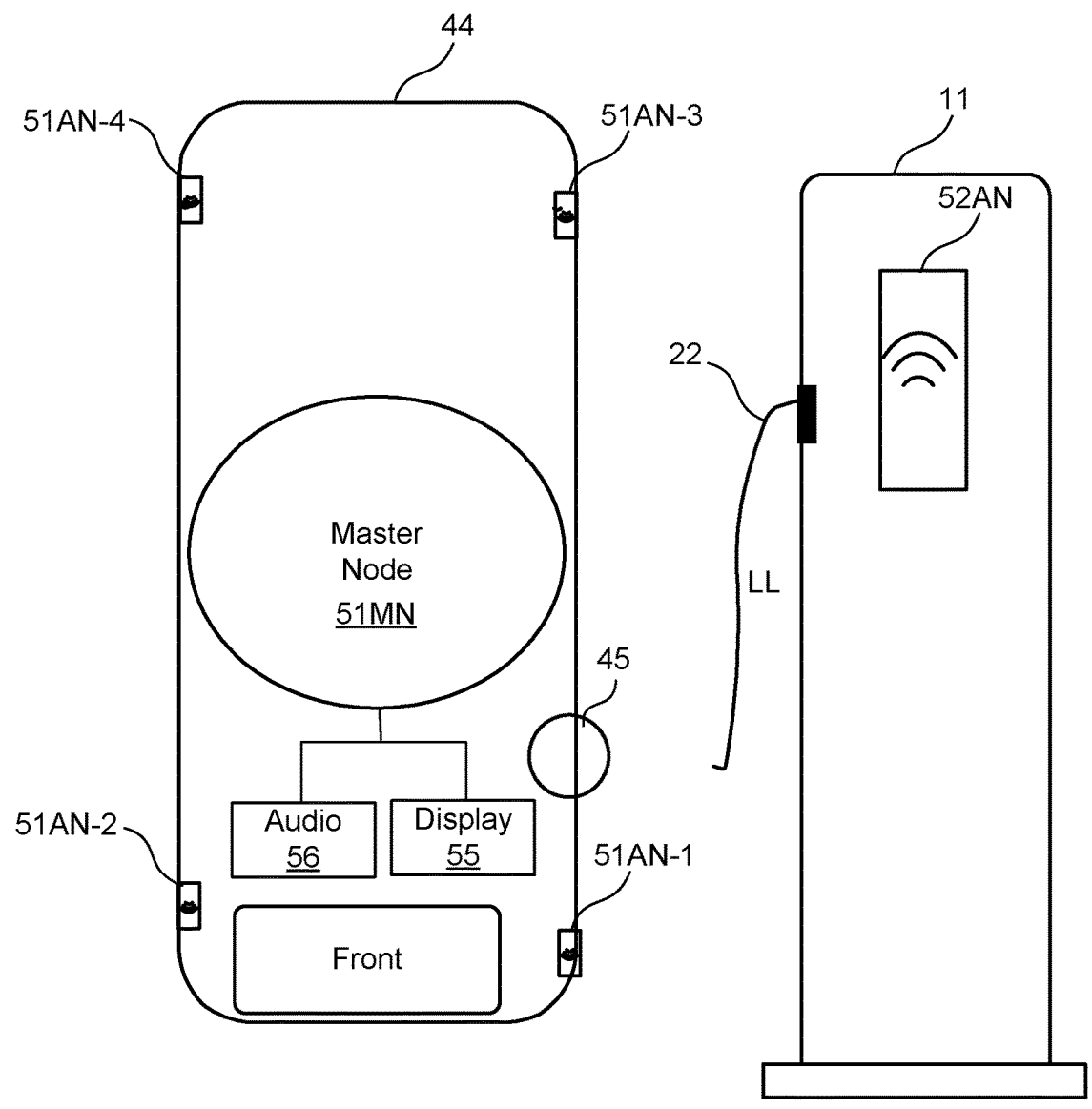
FIG. 6 is an illustration of the vehicle re-positioned in a reverse orientation in a parking space.

In example implementations, master node 51MN (or other computer) may further include "orientation" algorithms to determine an orientation of the vehicle in a parking space relative to the charging station. The orientation algorithms may be configured to determine orientation of the vehicle based on an evaluation (by master node 51MN or other computer) of the estimated distances (e.g., distances d1, d2, d3 and d4) of anchor node 52AN (on charging station 11) from each of the anchor nodes (e.g., anchor nodes 51AN-1, 51AN-2, 51AN-3, 51AN-4) placed on electrical vehicle 44. For example, in the scenario shown in FIGS. 4 and 5, electrical vehicle 44 is oriented with its front pointing in a positive Y direction. Anchor node 51AN-1 is located on the same side (e.g., a left side) of the vehicle as charging port 45 and anchor node 51AN-2 is located on the opposite side (e.g., a right side) of the vehicle as charging port 45. Further, the distance d1 of anchor node 51AN-1 is greater than the distance d2 of anchor node 51AN-2 from the charging station 11. In this scenario, upon evaluation of the estimated distances (e.g., distances d1, d2, d3 and d4), the orientation algorithms may determine that the vehicle is oriented in the parking space with the left side (with charging port 45) of the vehicle positioned further away from the charging station than the distance between the right side of the vehicle and the charging station. In this scenario, master node 51MN may prompt or guide the vehicle to be re-parked in a reverse orientation with its front pointing in the negative Y direction to bring the left side (with charging port 45) of the vehicle closer to the charging station and within a more convenient reach of the charging cable. FIG. 6 illustrates the vehicle re-positioned in a reverse orientation in the parking space with the vehicle front pointing in the − negative Y direction. In this orientation the left side (with charging port 45) of the vehicle is positioned closer to the charging station than the right side of the vehicle. Charging port 45 may be closer to the charging station in the vehicle parking orientation illustrated in FIG. 6 than in the parking orientation illustrated in FIG. 4 or 5. Charging port 45 may be more conveniently accessible or reachable by charging cable 22 (of fixed length LL) in the parking orientation illustrated in FIG. 6. For example, the charging cable does not have to be extended across the width of the vehicle to be plugged into the charging port.

In example implementations, master node 51MN (or other computer) may take into consideration the orientation of vehicle in preparing instructions to prompt or guide parking of electrical vehicle 44. Even if the charging port on the vehicle side away from the charging station is reachable for a particular vehicle orientation by charging cable of length LL the instructions may prompt the vehicle to be parked or re-parked in a different orientation placing the vehicle side with the charging port closer to the charging station (e.g., FIG. 6), Having the charging port on the vehicle side closest to the charging station may do away with a need for a user to pull or drag the charging cable across a width of the vehicle from the charging station for connection to a charging port disposed on the vehicle side away from the charging station.

Figure 7:
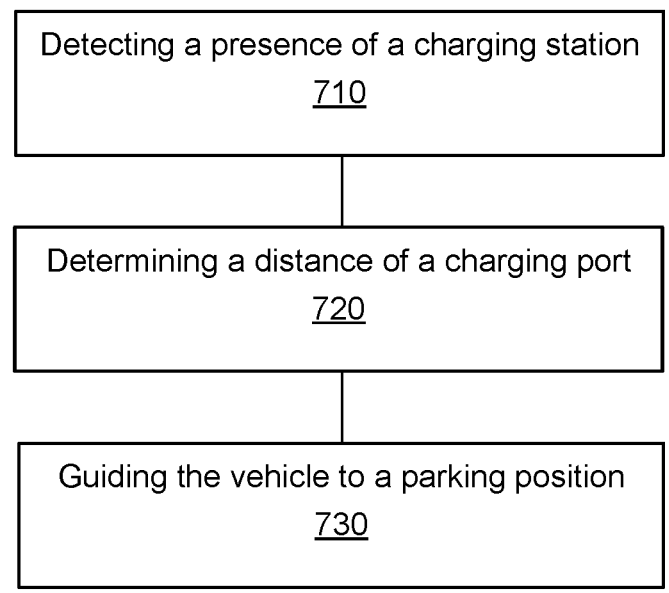
FIG. 7 illustrates a computer-implemented method for guiding an electric vehicle to a parking position for recharging at a charging station.

FIG. 7 illustrates a computer-implemented method 700 for guiding an electric vehicle to a parking position for recharging at a charging station.

The parking position for recharging may be in a designated parking space next to the charging station. The designated parking space may be one of one or more parking spaces associated with the charging station. The parking spaces may be marked (e.g., by a painted or structural divider) or unmarked, and may have known co-ordinates or dimensions (e.g., width and length) relative to the charging station. The charging station may be located on a side (e.g., a left side or a right side) of a parking space, or at a head of the parking space. The charging station may supply electric power to recharge the vehicle parked in the parking space over a charging cable having an end connector plugged into a vehicle socket (i.e., a charging port) on the vehicle. The charging cable, with one end fixed to the charging station (as shown for example, in FIG. 1) may have, for example, an available length L between charging station 10 and end connector 30. Length L may correspond to a maximum distance over which the charging cable may be extended away from the charging station to reach and fit in the charging port to deliver electric power to the electric vehicle. The electric vehicle itself may be of any vehicle type (e.g., car, bus, truck, van, etc.) and the charging port may be located on any side (e.g., front side, rear side, front left side, front right side, rear left side, rear right side) depending, for example, on the type or brand of the vehicle.

Method 700 involves using short range ultra-wideband (UWB) radio signals to localize the vehicle in a vicinity of the charging station, and to guide the vehicle to the parking position where the vehicle's charging port is within reach of the charging cable. UWB radio signals for localizing the vehicle may be exchanged over a wireless network formed by one or more anchor nodes (antennas) disposed on the vehicle and one or more anchor nodes (antennas) disposed on the charging station.

The vehicle and the charging station may also be equipped with means for communicating with each other over radio frequencies other than UWB frequencies. For example, the vehicle and the charging station may be each equipped with Bluetooth communication modules (transceivers) operating at frequencies in the range of about 2.400 GHz to about 2.4835 GHz. The Bluetooth communication modules may be effective for communication over large ranges or separation distances (e.g., up to a kilometer) between the vehicle and the charging station. The Bluetooth communication modules may, for example, be low power Bluetooth low energy (BLE) communication modules effective for communication over a range of a few hundred meters (e.g., up to 400 meters)

In an example scenario, the vehicle may include at least three UWB anchor nodes (antennas), and the charging station may include at least an UWB communication antenna or tag.

In this scenario, as shown in FIG. 7, method 700 includes detecting a presence of the charging station (710), determining a distance of the charging port (720), and guiding the vehicle to a parking position (730).

In example implementations, detecting the presence of the charging station 710 includes detecting, on the vehicle, a presence of the charging station in Bluetooth communication range of the vehicle. Detecting a presence of the charging station 710 may further include communicating with, a BLE module in the charging station when the vehicle is in BLE range of the charging station. Further, communicating with the BLE module in the charging station may include receiving information related to a type and an available length of the charging cable, and identification of one or more parking spaces associated with the charging station.

Method 700 may further include, in response to detecting the presence of the charging station in Bluetooth communication range (e.g., Bluetooth low energy (BLE) communication range) of the vehicle, activating an ultra-wide band (UWB) transceiver module on the vehicle to determine the distance of the charging port on the vehicle from the charging station. The UWB transceiver module may include a master node and at least three antenna nodes. The at least three antenna nodes may be deployed at correspondingly diverse locations in the vehicle at fixed distances from the charging port on the vehicle.

In example implementations, determining the distance of the charging port 720 may include determining the distance of the charging port on the vehicle from the charging station 720. Determining the distance of the charging port 720 may further include determining, by the master node, a position of an UWB antenna or tag disposed on the charging station relative to the locations of each of the at least three antenna nodes on the vehicle. Determining the position of the UWB antenna or tag on the charging station by the master node may include implementing time-of-flight measurements of UWB signals exchanged between each of the at least three antenna nodes on the vehicle and the UWB antenna or tag on the charging station to determine distances between each of the at least three antenna nodes and the UWB antenna or tag.

In example implementations, guiding the vehicle to a parking position 730 may include guiding the vehicle to park in a parking space associated with the charging station and may include parking the vehicle in a specific parking position in the parking space. Parking the vehicle in the specific parking position in the parking space may include determining the shortest distance to the charging port on the vehicle from the charging station, and when the shortest distance to the charging port is greater than an available length of the charging cable, guiding the vehicle to park in another specific parking position in the parking space.

In example implementations, parking the vehicle in a specific parking position in the parking space includes determining the shortest distance to the charging port on the vehicle from the charging station, and when the shortest distance to the charging port is greater than an available length of the charging cable, notifying the vehicle that it is properly parked in the parking space for recharging.

In example implementations, the vehicle may be self-driving vehicle, and guiding the vehicle to park in a parking space associated with the charging station 730 may include providing instructions to a vehicle controller.

In example implementations, the vehicle may be a person-driven vehicle, and guiding the vehicle to park in a parking space 730 may include providing instructions via text or graphics on a display and or audio instructions over a speaker.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to assisted driving. In some implementations, assisted driving can be performed by an assisted-driving (AD) system. For example, an AD system can include an advanced driving-assistance system (ADAS). Assisted driving involves at least partially automating one or more dynamic driving tasks. An ADAS can perform assisted driving and is an example of an assisted-driving system. Assisted driving is performed based in part on the output of one or more sensors typically positioned on, under, or within the vehicle. An AD system can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect an event and/or a change in one or more aspects of its environment and output signal(s) reflecting the detection. As illustrative examples only, a sensor can indicate one or more of a distance between the vehicle and an object, a speed of the vehicle, a trajectory of the vehicle, or an acceleration of the vehicle. A sensor can generate output without probing the surroundings with anything (e.g., like an image sensor that captures electromagnetic radiation), or the sensor can probe the surroundings (e.g., using electromagnetic radiation and/or sound waves) and detect a response to the probing. Examples of sensors that can be used with one or more embodiments include, but are not limited to: a light sensor (e.g., a camera); a scanning system (e.g., lidar); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); an inertial measurement unit; a torque sensor; a temperature sensor (e.g., a primary or secondary thermometer); a pressure sensor (e.g., for ambient air or a component of the vehicle); a humidity sensor (e.g., a rain detector); or a seat occupancy sensor.

Examples herein refer to a parking spot (or parking space). As used herein, a parking spot (or parking space) includes any location that can be identified as a place to render a vehicle stationary, regardless of the duration of the stay. The parking spot can be, but is not necessarily, defined by one or more markings or structure on the surface on which the vehicle sits. A parking spot can be located on public property or on private property. A parking spot can be located on developed land or on undeveloped land. A parking spot can be located at least partially within a structure or can be located away from any structures. A parking spot can be located inside a building or in open air. A parking spot can be located adjacent a roadway (e.g., street, avenue, or road) or can be located on premises that are set off from at least one roadway. When the parking spot is located adjacent a roadway, the roadway can have one or more lanes. When the parking spot is located adjacent a roadway, the roadway can be restricted to one-way travel (e.g., a one-way street), or can allow two-way traffic. A parking spot can be subject to parking regulations by a government and/or private entity. A parking spot can be subject to monitoring by human personnel and/or automated devices, or the parking spot can be unmonitored. A parking spot can be permanent or temporary. As used herein, a parking lot is a location that includes two or more parking spots.

Figure 8:
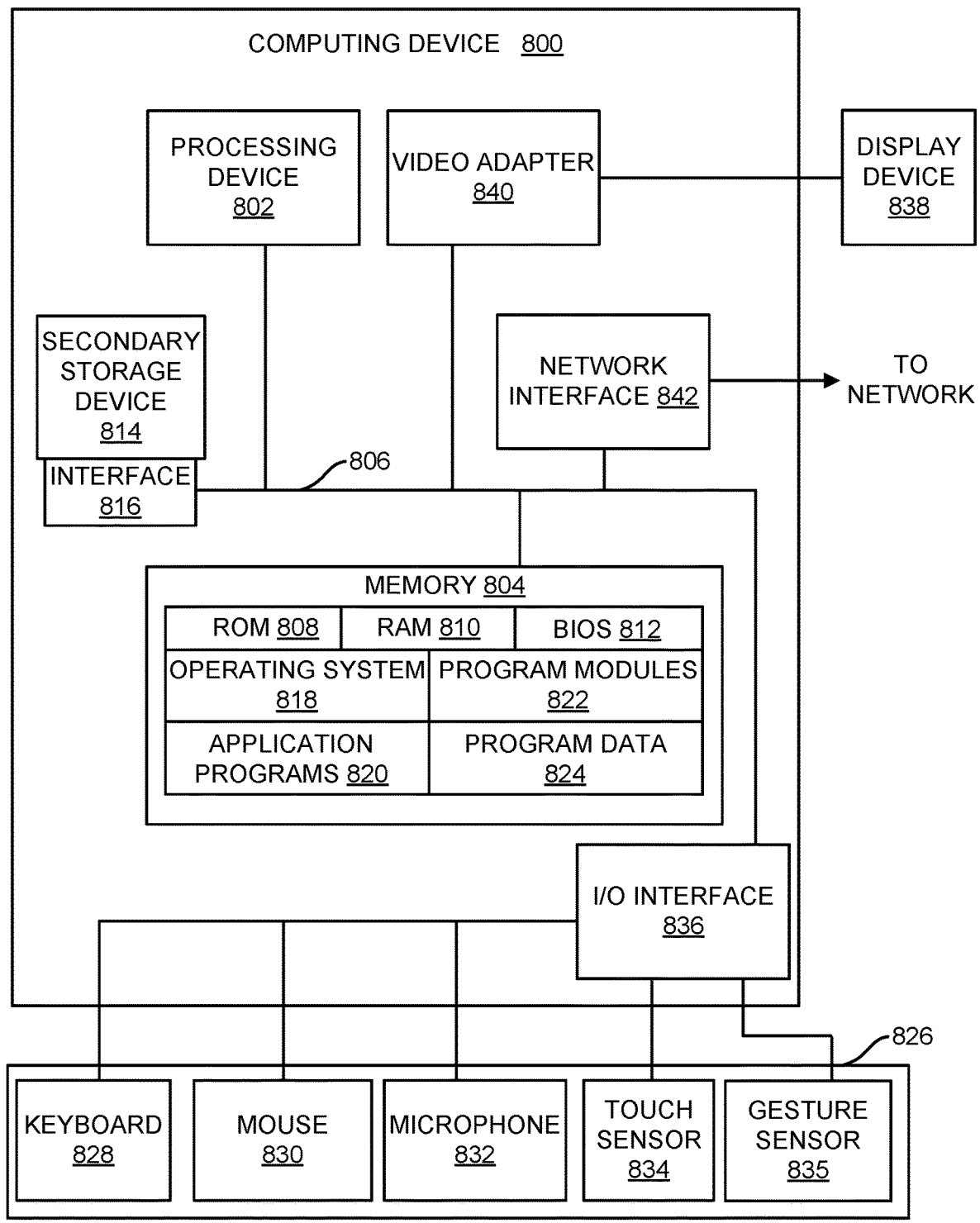
FIG. 8 illustrates an example architecture of a computing device 800 that can be used to implement aspects of the present disclosure.

FIG. 8 illustrates an example architecture of a computing device 800 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 8 can be used to execute the operating system, application programs, and/or software modules (including the software engines) described herein.

The computing device 800 includes, in some embodiments, at least one processing device 802 (e.g., a processor), such as a central processing unit (CPU). A variety of processing devices are available from a variety of manufacturers, for example, Intel or Advanced Micro Devices. In this example, the computing device 800 also includes a system memory 804, and a system bus 806 that couples various system components including the system memory 804 to the processing device 802. The system bus 806 is one of any number of types of bus structures that can be used, including, but not limited to, a memory bus, or memory controller; a peripheral bus; and a local bus using any of a variety of bus architectures.

Examples of computing devices that can be implemented using the computing device 800 include a desktop computer, a laptop computer, a tablet computer, a mobile computing device (such as a smart phone, a touchpad mobile digital device, or other mobile devices), or other devices configured to process digital instructions.

The system memory 804 includes read only memory 808 and random access memory 810. A basic input/output system 812 containing the basic routines that act to transfer information within computing device 800, such as during start up, can be stored in the read only memory 808.

The computing device 800 also includes a secondary storage device 814 in some embodiments, such as a hard disk drive, for storing digital data. The secondary storage device 814 is connected to the system bus 806 by a secondary storage interface 816. The secondary storage device 814 and its associated computer readable media provide nonvolatile and non-transitory storage of computer readable instructions (including application programs and program modules), data structures, and other data for the computing device 800.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 814 and/or system memory 804, including an operating system 818, one or more application programs 820, other program modules 822 (such as the software engines described herein), and program data 824. The computing device 800 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 800 through one or more input devices 826. Examples of input devices 826 include a keyboard 828, mouse 830, microphone 832 (e.g., for voice and/or other audio input), touch sensor 834 (such as a touchpad or touch sensitive display), and gesture sensor 835 (e.g., for gestural input). In some implementations, the input device(s) 826 provide detection based on presence, proximity, and/or motion. In some implementations, a user may walk into their home, and this may trigger an input into a processing device. For example, the input device(s) 826 may then facilitate an automated experience for the user. Other embodiments include other input devices 826. The input devices can be connected to the processing device 802 through an input/output interface 836 that is coupled to the system bus 806. These input devices 826 can be connected by any number of input/output interfaces, such as a parallel port, serial port, game port, or a universal serial bus. Wireless communication between input devices 826 and the input/output interface 836 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 838, such as a monitor, liquid crystal display device, light-emitting diode display device, projector, or touch sensitive display device, is also connected to the system bus 806 via an interface, such as a video adapter 840. In addition to the display device 838, the computing device 800 can include various other peripheral devices (not shown), such as speakers or a printer.

The computing device 800 can be connected to one or more networks through a network interface 842. The network interface 842 can provide for wired and/or wireless communication. In some implementations, the network interface 842 can include one or more antennas for transmitting and/or receiving wireless signals. When used in a local area networking environment or a wide area networking environment (such as the Internet), the network interface 842 can include an Ethernet interface. Other possible embodiments use other communication devices. For example, some embodiments of the computing device 800 include a modem for communicating across the network.

The computing device 800 can include at least some form of computer readable media. Computer readable media includes any available media that can be accessed by the computing device 800. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 800.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 8 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle, comprising:
a first Bluetooth low energy (BLE) communications module configured to detect a presence of, and communicate with, a second BLE communications module in a charging station when vehicle is in BLE range of the charging station, wherein the first BLE communications module and the second BLE communications module are configured to exchange information related to characteristics of the charging station and information related to characteristics of the vehicle;
a charging port on a side of the vehicle for connection to a charging cable capable of delivering electricity to the vehicle;
an ultra-wide band (UWB) transceiver module, the UWB transceiver module including a master node and at least three antenna nodes, the at least three antenna nodes deployed at correspondingly diverse locations in the vehicle at fixed distances from the charging port,
the master node configured to determine a position of an UWB antenna or tag external to the vehicle relative to the locations of the at least three antenna nodes and the charging port; and
a guidance system configured to guide, based on the determined position of the UWB antenna or tag relative to the charging port of the vehicle and a length of the charging cable, an orientation of the vehicle in a parking space associated with the charging station for connection of the charging port on the side of the vehicle.

2. The vehicle of claim 1, wherein the master node implements time-of-flight measurements of UWB signals exchanged between each of the at least three antenna nodes and the UWB antenna or tag external to the vehicle to determine distances between each of the at least three antenna nodes and the UWB antenna or tag external to the vehicle.

3. The vehicle of claim 1, wherein the UWB antenna or tag external to the vehicle is located in a charging station having the charging cable for delivering electricity to the vehicle via the charging port.

4. The vehicle of claim 1, wherein the master node is activated to determine the position of the UWB antenna or tag after the first BLE communications module detects the presence of, and communicates with, the second BLE communications module in the charging station.

5. The vehicle of claim 4, wherein the first BLE communications module receives information from the second BLE communications module in the charging station, the information including information related to an available length of the charging cable and identification of one or more parking spaces associated with the charging station, the identification of the one or more parking spaces including co-ordinates of the one or more parking spaces relative to the position of the UWB antenna or tag.

6. The vehicle of claim 1, wherein the guidance system provides guidance for the parking the vehicle in the parking space via visual aids and audio alarms.

7. The vehicle of claim 6, wherein the first BLE communications module receives a notification from the second BLE communications module confirming that the vehicle is properly parked for charging in the parking space associated with the charging station.

8. The vehicle of claim 1, wherein the UWB transceiver module includes at least one processor and at least one radio-frequency transceiver.

9. A computer-implemented method, comprising:
   detecting by a first Bluetooth low energy (BLE) communications module on a vehicle, a presence of a charging station in BLE communication range of the vehicle, the charging station including a second BLE communications module, and an ultra-wide band (UWB) communication antenna or tag;
   exchanging by the first BLE communications module on the vehicle and the second BLE communications module in the charging station, information related to characteristics of the charging station and information related to characteristics of the vehicle;
   when the vehicle is close within a UWB communication range of the charging station, determining, by UWB communications, a distance of a charging port on the vehicle from the charging station; and
   guiding the vehicle to a parking position in a parking space associated with the charging station for connection to a charging cable based on an available length of the charging cable and the determined distance of the charging port on the vehicle from the charging station, wherein guiding the vehicle to the parking position includes at least one of: providing instructions to a vehicle controller, providing instructions via text or graphics on a display, and providing audio instructions over a speaker.

10. The computer-implemented method of claim 9, wherein detecting the presence of the charging station includes detecting a presence of, and communicating with, the second BLE communications module in the charging station when the vehicle is in BLE communication range of the charging station.

11. The computer-implemented method of claim 10, wherein communicating with the second BLE module in the charging station includes receiving information related to a type and an available length of the charging cable, and identification of one or more parking spaces associated with the charging station.

12. The computer-implemented method of claim 10, further comprising, in response to detecting the presence of the charging station in BLE communication range of the vehicle, activating an ultra-wide band (UWB) transceiver module on the vehicle to determine the distance of the charging port on the vehicle from the charging station, the UWB transceiver module including a master node and at least three antenna nodes, the at least three antenna nodes deployed at correspondingly diverse locations in the vehicle at fixed distances from the charging port on the vehicle.

13. The computer-implemented method of claim 12, wherein determining the distance of the charging port on the vehicle from the charging station includes determining, by the master node, a position of an UWB antenna or tag disposed on the charging station relative to the locations each of the at least three antenna nodes on the vehicle.

14. The computer-implemented method of claim 13, wherein determining the position of the UWB antenna or tag by the master node includes implementing time-of-flight measurements of UWB signals exchanged between each of the at least three antenna nodes on the vehicle and the UWB antenna or tag on the charging station to determine distances between each of the at least three antenna nodes and the UWB antenna or tag.

15. The computer-implemented method of claim 9, wherein guiding the vehicle to park in a parking space associated with the charging station includes parking the vehicle in a specific parking position in the parking space and determining a shortest distance to the charging port on the vehicle from the charging station, and when the shortest distance to the charging port is greater than an available length of the charging cable, guiding the vehicle to park the vehicle in another parking position in the parking space.

16. The computer-implemented method of claim 9, wherein guiding the vehicle to park in a parking space associated with the charging station includes parking the vehicle in a specific parking position in the parking space and determining a shortest distance to the charging port on the vehicle from the charging station, and when the shortest distance to the charging port is greater than an available length of the charging cable, notifying the vehicle that it is properly parked in the parking space for recharging.

17. The computer-implemented method of claim 9, wherein the vehicle is self-driving vehicle and wherein guiding the vehicle to park in a parking space associated with the charging station includes providing instructions to a vehicle controller.

18. The computer-implemented method of claim 9, wherein the vehicle is a person-driven vehicle and wherein guiding the vehicle to park in a parking space associated with the charging station includes providing instructions via text or graphics on a display and or audio instructions over a speaker.

* * * * *